INVENTOR.
KARL SCHLÖR
BY Raymond P. Wallace

AGENT

May 26, 1964  K. SCHLÖR  3,134,369
AIR COOLING OF ROTARY-PISTON ENGINES
Filed March 7, 1962  3 Sheets-Sheet 3

INVENTOR.
KARL SCHLÖR
BY Raymond P. Wallace

AGENT

United States Patent Office 3,134,369
Patented May 26, 1964

3,134,369
AIR COOLING OF ROTARY-PISTON ENGINES
Karl Schlör, Lochham, near Munich, Germany, assignor to NSU Motorenwerke Aktiengesellschaft, Neckarsulm, Germany, and Wankel G.m.b.H., Lindau (Bodensee), Germany
Filed Mar. 7, 1962, Ser. No. 178,193
Claims priority, application Germany Mar. 8, 1961
3 Claims. (Cl. 123—8)

The present invention relates to air cooling of rotary-piston engines, and more particularly to the differential supply of cooling air to various portions of such engines. As is known in the art, rotary-piston engines form variable-volume working chambers between an eccentric inner rotor and an outer housing, which may be either stationary or rotary, and the present invention makes possible an effective means of air cooling such engines, with the advantages of low weight and adaptation of the individual parts of the engine to the temperatures encountered.

These advantages are attained in the present invention by dividing the intake of cooling air into two separate partial flows of unequal volume, whereby the hotter region of the engine, in which combustion takes place, receives the partial flow of greater volume, and the region in which induction and compression takes place receives the partial flow of smaller volume. The cooling system may be designed to provide any desired ratio between the two partial flows: it has been found convenient in the present embodiment to provide a ratio of approximately 2 to 1.

Cooling air can be supplied by any convenient means, a centrifugal blower for example, whose housing may be formed into two channels, of which one receives about ⅔ the output of the blower and the other about ⅓ of the output. Thus the cooling air is divided into two partial flows under the same blower pressure and having cross sections in a ratio of approximately 2 to 1. The blower may be mounted directly on the engine shaft and driven thereby, but it may also be mounted in some other convenient location and driven separately, as by an electric motor or indirectly from the engine shaft. The two flow channels may lead to associated portions of the air cooling conduits, to suit their cross sections within the engine shell.

The guidance of the air within the outer shell and around the engine itself can be designed in accordance with the invention so that the partial flow of greater volume travels over those regions of the engine in which combustion takes place and which consequently need greater cooling, while the smaller flow may be directed over the remaining portions of the engine where a relatively smaller amount of heat needs to be dissipated.

For the purpose of suitable differential dissipation of the heat from various parts of the engine, cooling fins may be provided on the engine housing and within the outer air shell; such fins may project to different height and thereby offer different surface areas. Thus, in the hotter regions of the engine where more cooling is required and a greater volume of air is provided, the cooling fins may be larger.

In order to limit heat distortion effects, particularly those in the end plates of the engine housing, the cooling fins and the channels between them run longitudinally in the direction of the varying heat stresses in the corresponding regions of the end plates.

Each partial flow of cooling air may be directed, in accordance with the invention, so that it is supplied to the less hot region of the engine and flows toward the hotter regions; that is, the larger partial flow traverses the engine surface toward that portion where the spark plug is disposed, and the smaller partial flow moves toward the exhaust region. The two partial flows can consequently be guided in directions more or less opposite, and may be separated from one another by a suitable partition within the cooling shell.

As a variation of the present system, the two partial flows may also be made of substantially equal cross section, but under different pressures, so that again the hotter region may be supplied with a greater volume of cooling air than is supplied to other regions.

It is therefore a primary object of this invention to provide air cooling for a rotary-piston engine.

It is another object of the invention to provide differential cooling of regions of the engine.

A further object is to provide separate cooling air flows over the engine.

The foregoing objects and others ancillary thereto will be readily understood on reading the following specification in connection with the drawings, in which—

Figure 1:
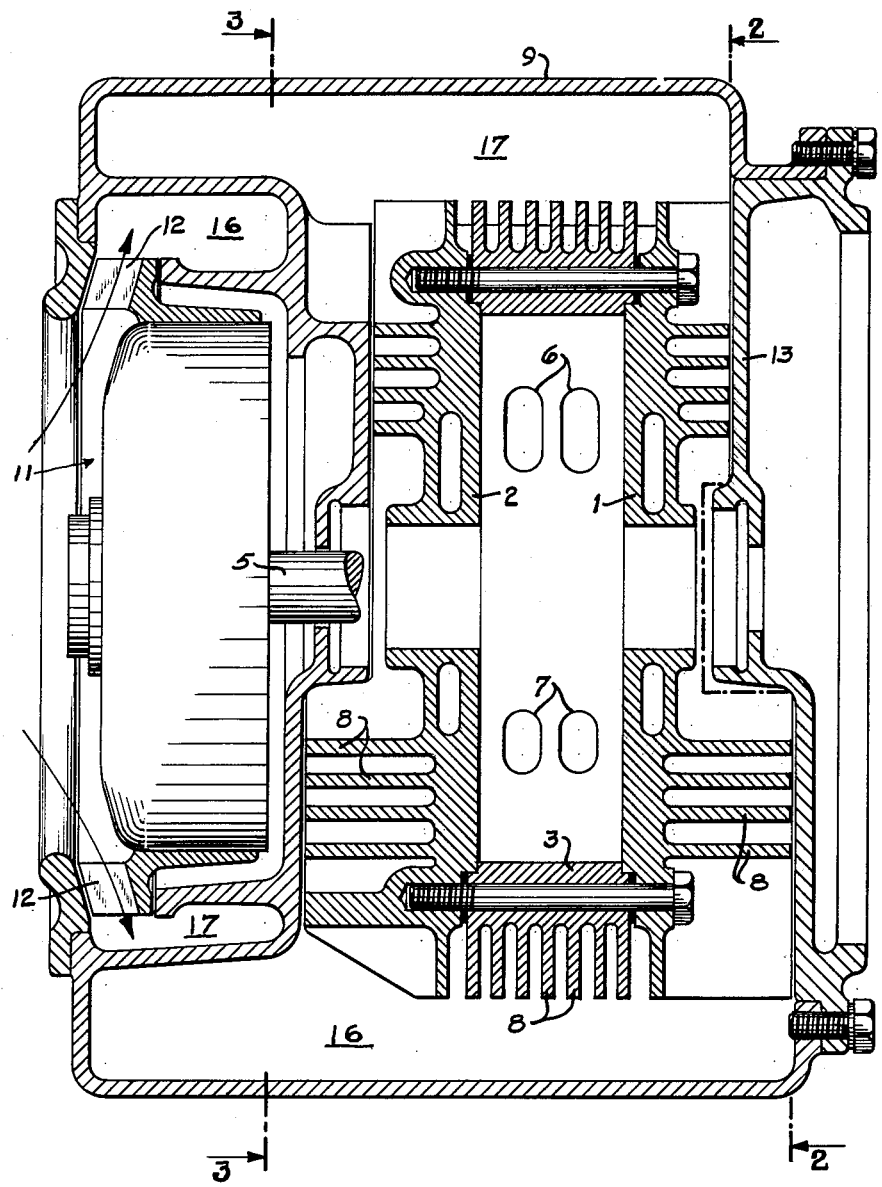
FIG. 1 shows a vertical cross section on the axis of a rotary-piston engine, taken on the plane 1—1 of FIG. 2.

In FIG. 1 there is shown a longitudinal vertical cross section of a rotary-piston engine with the inner rotor, or rotary-piston, removed. There is provided an engine housing comprising two end plates 1 and 2 spaced apart by an intermediate peripheral housing 3 having an inner surface of basically epitrochoidal contour in which an eccentric rotor (not shown) turns, imparting rotation to shaft 5 disposed on the longitudinal axis of the machine. The peripheral housing is provided with intake ports 6 and exhaust ports 7. Thus far such engines are known in the art.

In order to facilitate adequate air cooling of the engine, the housing including both the end plates and the intermediate peripheral portion is provided with projecting fins 8, which may be made of different heights correlating with the amount of heat to be dissipated from associated regions of the engine. Surrounding the engine housing is an outer shell 9, with a centrifugal blower 11 provided with fan blades 12 positioned at one end thereof. In this embodiment the blower is mounted on shaft 5 which imparts rotation thereto, and the opposite end of the shell is provided with a suitable closure 13.

Figure 2:
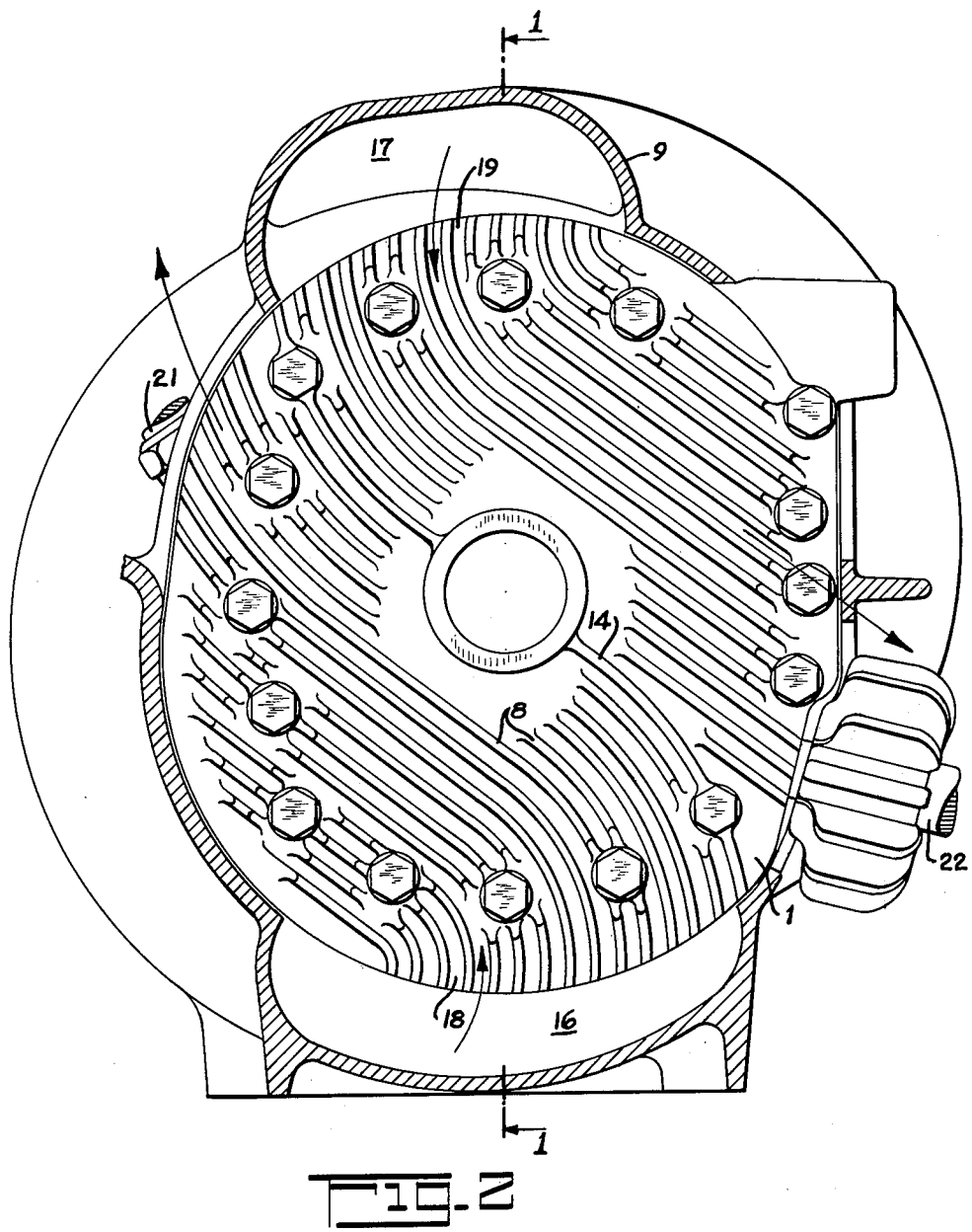
FIG. 2 shows an air cooled rotary-piston engine looking in the axial direction, with the outer cooling shell sectioned along line 2—2 of FIG. 1.

FIG. 2 shows one end of the engine housing, with the outer shell shown partially in cross section, and more detail of the cooling fins 8 on end plate 1, the cooling fins being suitably curved in the direction of the varying heat stresses. Cooling air supplied by the blower and guided by the shell flows through the passages between the fins. A partition wall 14, curved in the same manner as the fins, runs generally diagonally across the end plate, separating the hotter region of the engine from the cooler region, and one partial flow from the other, in order to provide guidance of the differential air flows.

Figure 3:
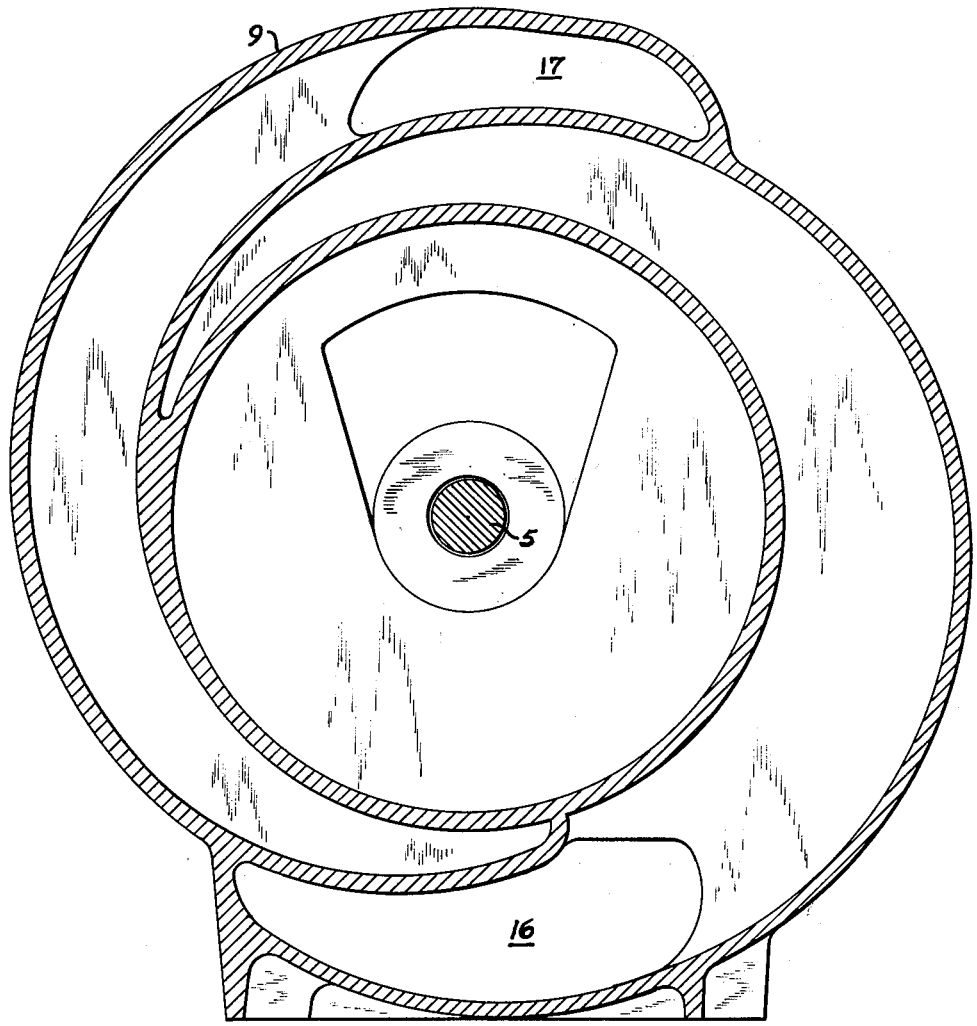
FIG. 3 shows an axial view of the outer cooling shell sectioned along line 3—3 of FIG. 1, with the blower removed.

FIG. 3 shows a cross section through the outer shell, taken generally on the plane 3—3 of FIG. 1, with the blower removed from the assembly. Shell 9 may be described generally as comprising a pair of interlocked volutes 16 and 17. Air is supplied by the blower, passing through the fan blades as shown by the arrows in FIG. 1. Volute 16 is the larger of the two, having a cross section approximately twice that of volute 17. The larger volute receives the partial flow of air from about ⅔ of the blower periphery, and the smaller volute receives the partial flow from the remaining ⅓.

As will be seen in FIG. 2, the larger flow from volute 16 is supplied to the hotter portion of the engine housing at 18 and passes between the higher fins to exit from the shell in the vicinity of the spark plug 21. The lesser partial flow is supplied to the cooler portion of the housing at 19 and passes across the lower fins to leave the shell in the region of the exhaust 22.

Although the present invention has been described above in a preferred embodiment, it will be understood by those skilled in the art that various modifications may be made without departing from the scope of the invention. It is intended to cover all such modifications in the appended claims.

What is claimed is:

1. Air-cooling means for rotary-piston engines, comprising in combination an engine having a housing and having a first region of relatively high heat input and a second region of lesser heat input, a shell surrounding said housing and divided into a pair of volutes surrounding different portions of said housing and conveying cooling air thereacross, each of said volutes having an intake opening and a discharge opening, a blower positioned by said shell and supplying cooling air to both said intake openings, one of said volutes being of larger cross-section than the other and having a larger intake opening and receiving a larger portion of the cooling air supplied by said blower and positioned to pass said cooling air across said first region of higher heat input, and the other of said volutes being positioned to pass said cooling air across said second region of lesser heat input.

2. The combination recited in claim 1, wherein said housing has a first group of fins projecting outwardly therefrom in the region of higher heat input, and a second group fins projecting outwardly therefrom in the region of lesser heat input, the fins of said first group projecting further outwardly than the fins of said second group and being disposed within said larger volute, said second group of fins being disposed within said smaller volute.

3. The combination recited in claim 2, wherein said higher heat input region contains a combustion zone of said engine and the intake opening of said larger volute is disposed in a region of lower temperature than said combustion zone and the discharge opening of said larger volute is disposed adjacent to said combustion zone, and said lesser heat input region contains an exhaust zone of said engine and the intake opening of said smaller volute is disposed in a region of lower temperature than said exhaust zone and the discharge opening of said smaller volute is disposed adjacent to said exhaust zone.

References Cited in the file of this patent

UNITED STATES PATENTS

| 1,504,926 | Baisch | Aug. 12, 1924 |
| 2,737,161 | Gaskell | Mar. 6, 1956 |

FOREIGN PATENTS

| 631,757 | Canada | Nov. 28, 1961 |